United States Patent
Buslepp et al.

(10) Patent No.: US 8,561,592 B2
(45) Date of Patent: Oct. 22, 2013

(54) METHOD AND SYSTEM FOR GENERATING AN IN-CYLINDER PRESSURE SENSOR SIGNAL

(75) Inventors: Kenneth J. Buslepp, Brighton, MI (US); Douglas R. Verner, Sterling Heights, MI (US)

(73) Assignee: GM Global Technology Operations LLC

( * ) Notice: Subject to any disclaimer, the term of this patent is extended or adjusted under 35 U.S.C. 154(b) by 785 days.

(21) Appl. No.: 12/480,047

(22) Filed: Jun. 8, 2009

(65) Prior Publication Data

US 2010/0307453 A1    Dec. 9, 2010

(51) Int. Cl.
  F02P 5/00      (2006.01)
  G06F 19/00    (2011.01)
  G06G 7/70     (2006.01)
  G01L 23/22    (2006.01)

(52) U.S. Cl.
  USPC ............... 123/406.41; 701/111; 73/35.03

(58) Field of Classification Search
  USPC ............ 123/435, 406.22, 406.26, 406.41–43; 701/111, 114; 702/182, 183, 185, 702/189–194
  See application file for complete search history.

(56) References Cited

U.S. PATENT DOCUMENTS

| | | | |
|---|---|---|---|
| 7,073,485 B2* | 7/2006 | Truscott et al. | 123/406.22 |
| 2006/0030999 A1* | 2/2006 | Shinozaki et al. | 701/114 |
| 2008/0173070 A1 | 7/2008 | Kassner | |
| 2008/0294323 A1* | 11/2008 | Shinozaki et al. | 701/102 |
| 2011/0106394 A1* | 5/2011 | Buslepp et al. | 701/102 |

FOREIGN PATENT DOCUMENTS

CN    101418727    4/2009

OTHER PUBLICATIONS

Paolo Prandoni and Martin VetterliSignal Processing for Communications Presses polytechniques et universitaires romandes, 2008 chapter 7 web edition available on PFD and HTML in sight below http://www.sp4comm.org/download.html attached as reference document in PFD.*

* cited by examiner

*Primary Examiner* — Stephen K Cronin
*Assistant Examiner* — Sherman Manley

(57) ABSTRACT

A method and a control module that includes a filter coefficient determination module that generates filter coefficients based upon an engine operating conditions. The control module includes a filter module that filters the in-cylinder pressure signal with a filter having the filter coefficients to form a filtered pressure signal and an engine control module that controls the engine using the filtered pressure signal.

18 Claims, 5 Drawing Sheets

METHOD AND SYSTEM FOR GENERATING AN IN-CYLINDER PRESSURE SENSOR SIGNAL

FIELD

The present disclosure relates generally to a method and system for controlling an engine, and, more specifically to a method and system for generating in-cylinder pressure sensor signals.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Determining the successful operation of various hardware associated with the engine typically requires several sensors for determining the states of the various types of hardware. Providing separate sensors for each of the different parts of the engine increases the overall cost of the engine and, therefore, increases the cost of the vehicle. Automobile manufacturers are under increased pressure to reduce costs while providing a reliable vehicle.

One sensor that may be used within a vehicle is an in-cylinder pressure sensor. The in-cylinder pressure sensor provides feedback for operating the engine. The in-pressure sensor signal may have a significant amount of noise. Low-pass filtering with a band pass filter may attenuate the signal to unacceptable levels so that sufficient pressure data may not be obtained.

SUMMARY

The present disclosure provides a system and method for generating in-cylinder pressure sensor signals and controlling an engine therewith.

In one aspect of the disclosure, a method includes generating an in-cylinder pressure signal for an engine, filtering the in-cylinder pressure signal with a filter having filter coefficients based upon an engine operating condition to form a filtered pressure signal, and controlling the engine using the filtered pressure signal.

In another aspect of the disclosure, a control module includes a filter coefficient determination module that generates filter coefficients based upon an engine operating conditions. The control module includes a filter module that filters the in-cylinder pressure signal with a filter having the filter coefficients to form a filtered pressure signal and an engine control module that controls the engine using the filtered pressure signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
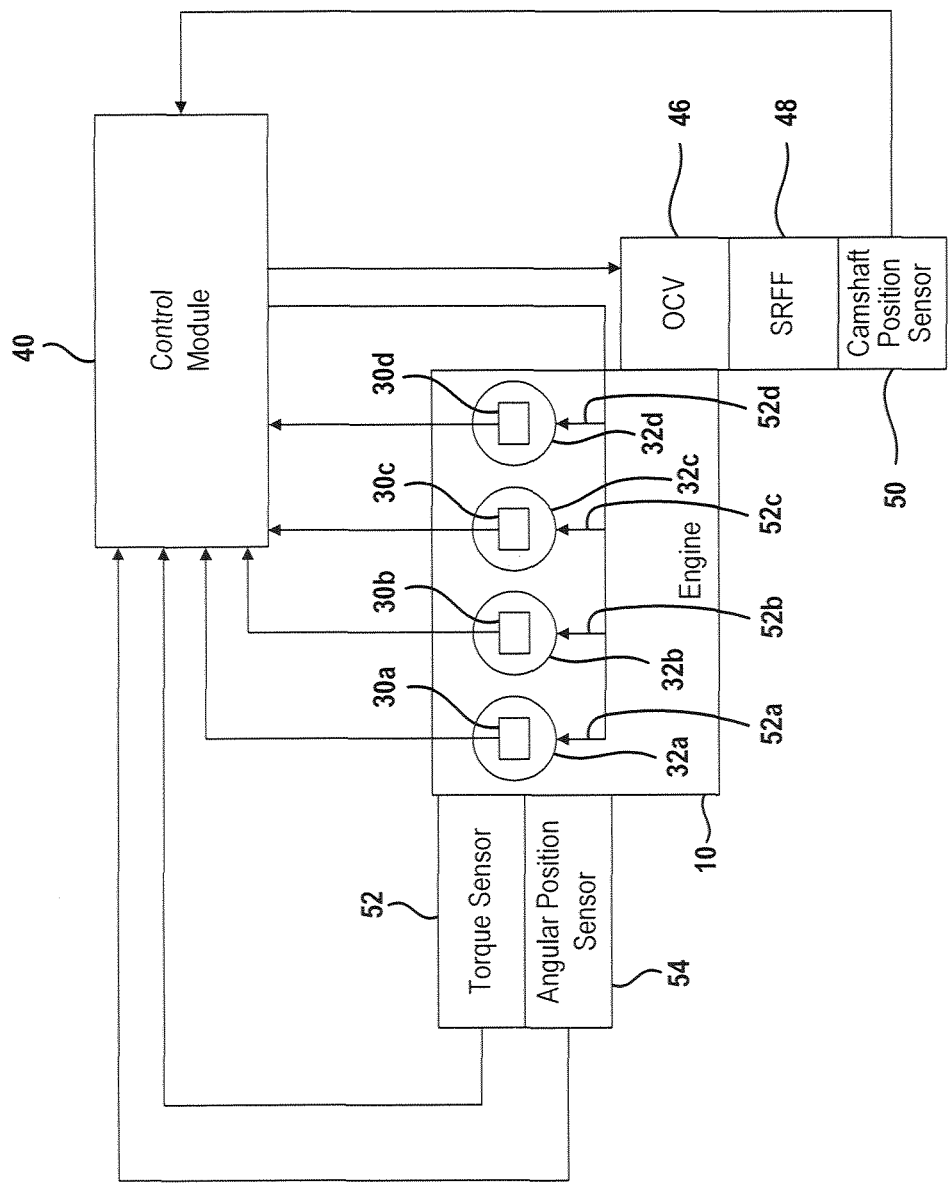
FIG. 1 is a block diagrammatic view of the control system of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 may include in-cylinder pressure sensors 30A, 30B, 30C and 30D in respective cylinders 32A-32D. Each in-cylinder pressure sensor 30A-30D generates an in-cylinder pressure signal that is communicated to a control module 40. The control module 40 may be an engine control module. Although only four cylinders 30A-30D are shown, the engine may include many different numbers of cylinders and corresponding pressure sensors.

The engine 10 may be a variable valve timing engine that includes an oil control valve (OCV) 46 used to control switchable roller finger followers 48. Of course, the present disclosure may apply to various other types of engines.

The control module 40 may include a controller for the oil control valve 46 that is used to control the flow of oil that is used to control the switchable roller finger followers 48. The oil control valve 46, if not operating properly, may be evident in the cylinder pressures of two cylinders. The switchable roller finger follower 48 may also individually fail in the in-cylinder pressure outputs as will be described below.

A camshaft position sensor 50 may also provide an angular position signal to the control module 40. In the following disclosure, the operation of the camshaft position sensor or the failure thereof may be diagnosed. The camshaft position sensor indicates a position and thus the expected valve position for valves 52a-52d. When the valves 52a-52d are operating properly as indicated by the in-cylinder pressure, a fault in the camshaft position sensor 50 may be determined.

The control module 40 thus indirectly controls the operation of valves 52a, 52b, 52c and 52d and can determine the stability of operation thereof. Although only one valve is illustrated for simplicity, each cylinder includes at least one intake valve and at least one exhaust valve. Multiple intake and exhaust valves may also be provided within the engine.

The control module 40 may determine if spark is enabled for each cylinder, whether an injector fault or ignition coil fault is present and the expected position of the piston within the cylinder. The control module 40 may manage the torque of the engine and generate pressure-volume curves corresponding to the operation of the engine.

A torque sensor 52 may generate a torque signal provided to the control module 40. The torque sensor 52 may be a direct sensor or an indirect sensor. The torque sensor 52 may generate a torque signal based upon an input such as an accelerator pedal input. Thus, the torque sensor 52 may provide a desired torque sensor signal to the control module 40.

An angular position sensor 54 may generate an angular position signal corresponding to the angular position of the crankshaft of the engine. The angular position signal may be provided to the control module 40. More than one of the torque sensor signal, the angular position sensor signal and the magnitude or amplitude of the pressure sensor signal may be used by the control module in determining filter coefficients for filtering the pressure sensor signals as will be described below.

Figure 2:
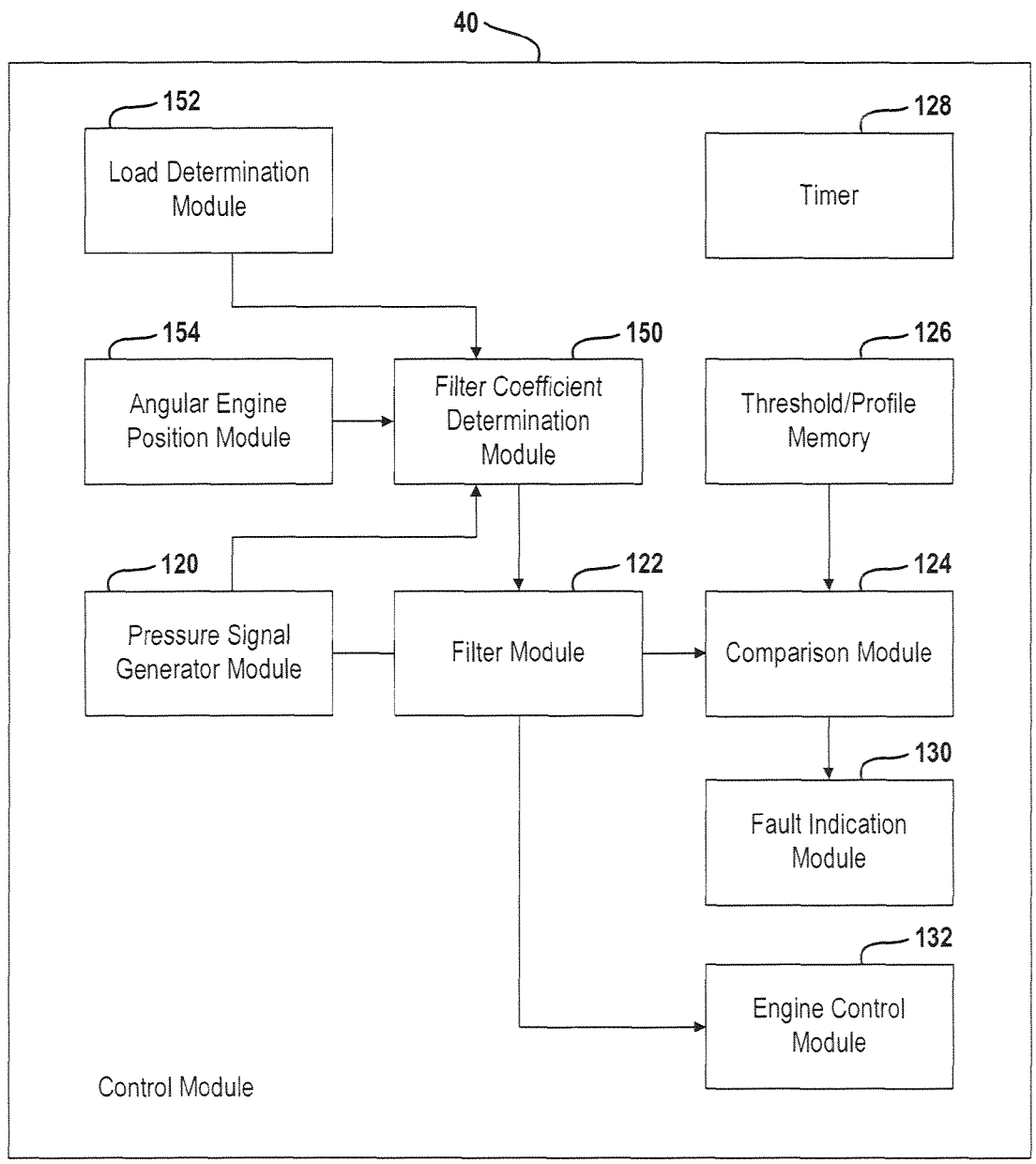
FIG. 2 is a block diagrammatic view of a control module according to the present disclosure.

Referring now to FIG. 2, the control module 40 of FIG. 1 is illustrated in further detail. The control module 120 may include a pressure signal generator module 120. Each of the pressure sensors 30A-30D may be used to generate a pressure signal. The pressure signal generator module 120 may receive the pressure signals from the pressure sensors and convert them into a form usable by the rest of the control module. As will be described below, each of the pressure signals from each of the cylinders may be used.

A filter module 122 is used to filter the pressure signals from the pressure signal generator. Various types of filters may be used. For example, the filter module 122 may include a finite impulse response digital filter having various coefficients. Also, an infinite impulse response filter may be used.

A comparison module 124 may also be provided within the control module 40. The comparison module 124 may perform the various comparisons between the pressure signals or derivations of pressure signals. The thresholds and profiles in a memory 126 may also be used by the comparison module.

The comparison module 124 may compare the measured pressure sensor signal with a threshold to determine whether or not the intake or exhaust valves are closing and if the operation of the valves have been stable for a predetermined period. The comparison module 124 may also determine whether or not the valves in the engine have been deactivated or reactivated during cylinder deactivation. The comparison module 124 may also be used to determine whether the camshaft position sensor is operating properly in response to the cylinder pressure. The comparison module 124 may compare a coefficient of variation to determine whether the valves have transitioned properly. The comparison module 124 may also compare the slopes or integrals of a pressure-volume curve to determine whether the oil control valve or the switchable roller finger followers are operating properly within the engine.

The control module 40 may also include a timer 128 for measuring times between various events or timing various events. The timer 128 may also time relative times between various events.

A fault indication module 130 may be in communication with the comparison module 124. When the comparison module 124 indicates that a pressure sensor signal is out of range, the fault indication module 130 may generate a fault that is communicated to the vehicle operator stored within a memory.

The control module 40 may also include an engine control module 132. The filtered pressure signals may be provided to the engine control module 132 for controlling various functions within the engine. The various functions may include controlling the switchable roller finger followers and the oil control valves as described above. Of course, other engine functions may also be controlled using the pressure signals.

The filter module 122 may receive filter coefficients from a filter coefficient determination module 150. The filter coefficient determination module 150 may generate filter coefficients based upon various engine operating conditions. The engine operating conditions may include determining a torque from a load-determination module 152. The load-determination module may determine the engine load or torque based upon various inputs such as an accelerator pedal input.

The filter coefficient module 150 may also receive an angular engine position signal from an angular engine position module 154. The angular engine position module may provide an engine angular position from an engine crankshaft or more likely from an engine camshaft position signal.

The filter coefficient determination module 150 may also be in communication with a pressure signal generator module 120. The amplitude of the pressure signals may be used to change the filter coefficients in the filter coefficient determination module 150.

By way of example, the filter coefficient determination module 150 may vary the filter coefficients based upon the load (torque) of the engine. Thus, the filter coefficients may be changed during various loading conditions. Likewise, based upon the angular position of the camshaft or crankshaft, the filter coefficients may be changed. Thus, over the operation of the engine the filter coefficients may be varied. In one example, the filter coefficients may be changed from a first set to a second set when the load (torque), position or magnitude increases above a threshold and changes back to the first set of coefficients when below the threshold. Of course, several thresholds may be provided at various intervals of load, pressure signal amplitude or angular position. By way of example, the filter coefficients may be relaxed or changed at 20 degrees before top dead center and resume normal operation 60 degrees after top dead center. This provides operation for two different sets of coefficients based on position of the crankshaft. The relaxation in the filter coefficients may be configured to shift the filter gain by three decibels. Optimum filter values and positions may be determined based upon engine calibrations. The filter coefficients may be calibrated during the development of the engine. The filter coefficients may be obtained from a look-up table or calculated during the engine operation process.

Figure 3:
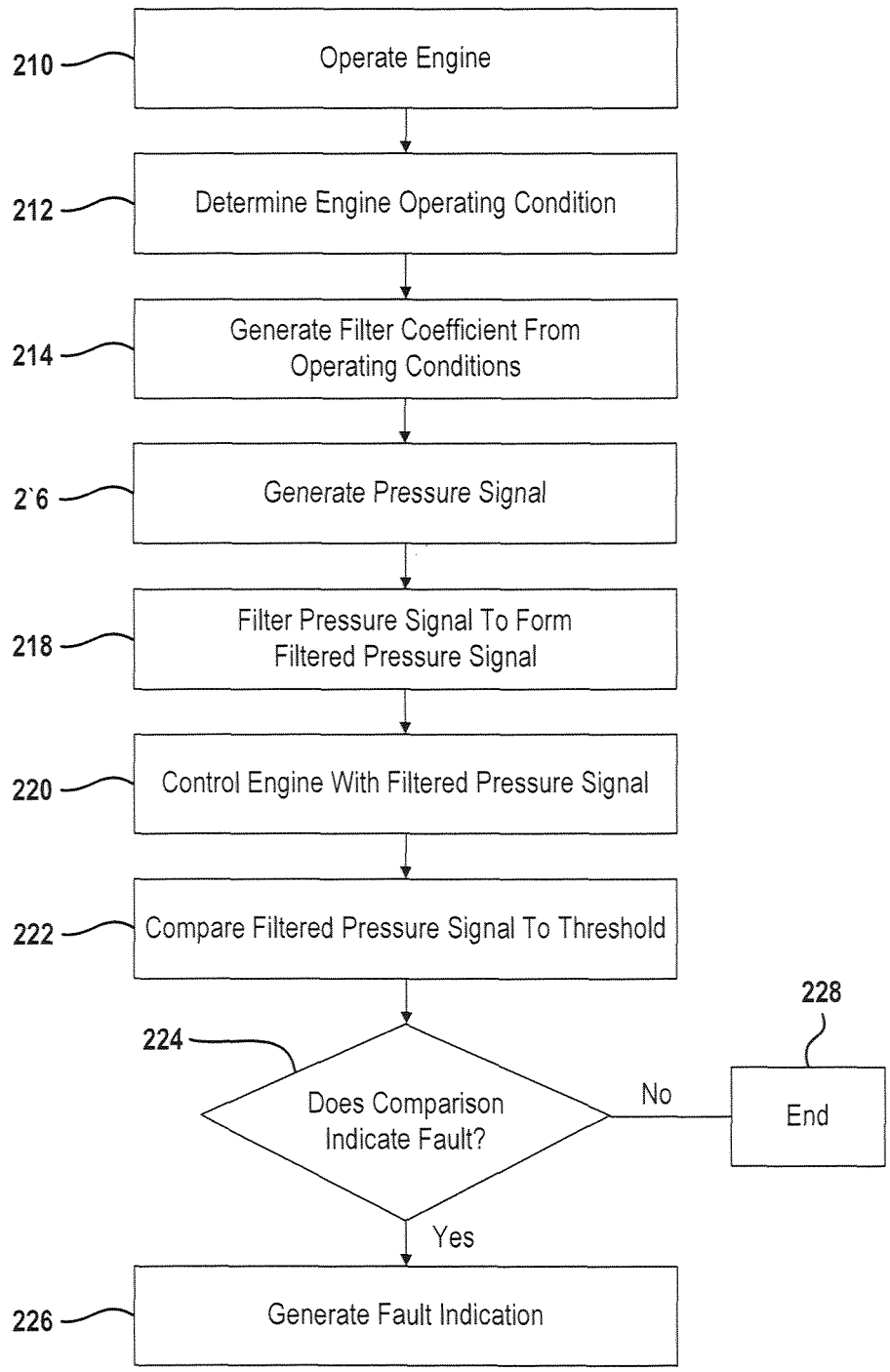
FIG. 3 is a flowchart of a method for determining whether a valve is operating properly.

Referring now to FIG. 3, a method of operating the engine is illustrated. In step 210, the engine is operated. In step 212, the engine operating conditions are determined. As mentioned above, various engine operating conditions, including the angular position of the crankshaft or camshaft may be determined, the load may be determined and the amplitude of the pressure signals may be determined.

The filter coefficients may be generated based upon the engine operating conditions. The filter coefficients may vary based upon the load, angular position or the amplitude of the pressure signal. The filter coefficients may also vary based upon more than one of the load, angular position or pressure signal.

In step 216, the pressure signal from the pressure sensor is generated. As described above, more than one pressure signal may be generated. As mentioned above, one pressure signal per cylinder may be generated.

In step 218, the pressure signal is filtered to form a filtered pressure signal based upon the filter coefficients. The filter may be a finite impulse response (FIR) filter or an infinite impulse response (IIR) filter. Of course, other types of filters having digital coefficients may be used. In step 220, the engine is controlled with the filtered pressure signal.

One example of the engine controlling in response to the filtered pressure signal is comparing the filtered pressure signal to a threshold in step 222. In step 224, the comparison is monitored to determine if a fault is indicated. If a fault is indicated in the comparison, step 226 generates a fault indicator. The comparison in step 224 may compare the filtered pressure signal to the threshold and when the filtered pressure signal is above a threshold, a fault may not be generated. Likewise, the threshold may be compared to the filtered pressure signal and when the filtered pressure signal is below a threshold, a fault may not be indicated. The threshold may also be a threshold band above which and below which a filtered pressure signal indicates a fault or vice versa. In step 224, if a fault is not indicated by the comparison of step 222, step 228 ends the process.

Figure 4A:
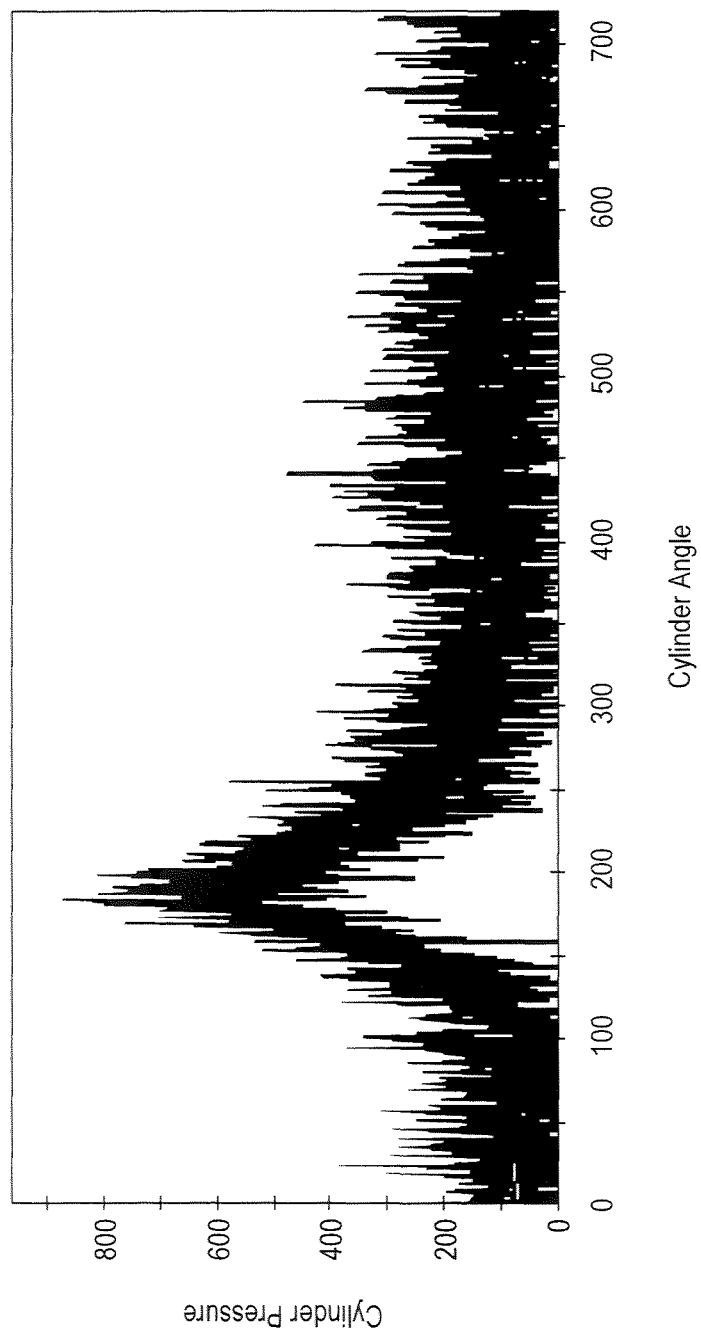
FIG. 4A is a plot of the pressure signal versus the angular position of an unfiltered signal.
Figure 4B:
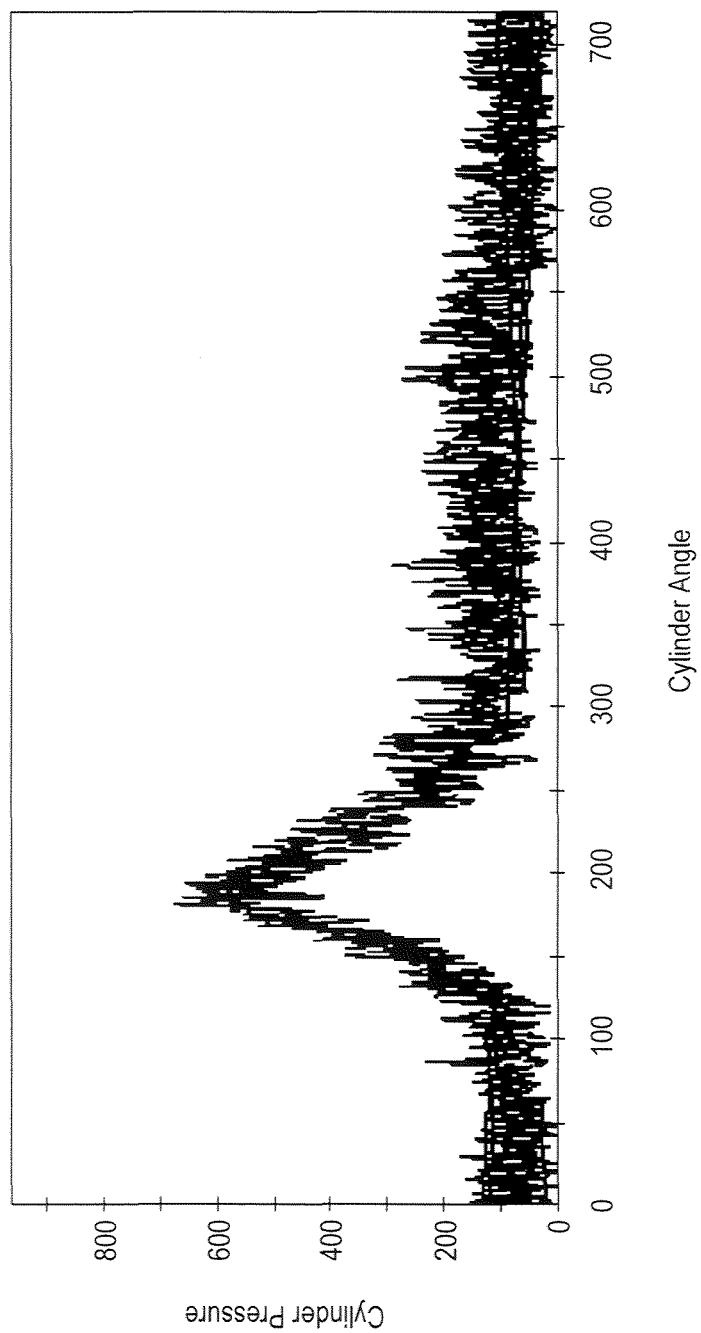
FIG. 4B is a plot of a filtered pressure signal according to the present disclosure.

Referring now to FIGS. 4A and 4B, FIG. 4A illustrates a pressure signal without noise suppression provided by the present disclosure. In FIG. 4B, noise suppression has been provided with coefficients based upon the position of the crankshaft. As can be seen, the signal in FIG. 4B is less noisy than that of FIG. 4A.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   generating an in-cylinder pressure signal for a cylinder of an engine;
   generating filter coefficients for a filter based on an engine operating condition of the engine;
   filtering the in-cylinder pressure signal with the filter to form a filtered pressure signal;
   controlling the engine based on the filtered pressure signal;
   comparing the filtered pressure signal to a threshold; and
   generating a diagnostic signal for an engine component in response to the comparison.

2. The method of claim 1 wherein the engine component comprises cylinder valves.

3. The method of claim 1 wherein the engine operating condition includes an engine load.

4. The method of claim 1 wherein the engine operating condition includes angular engine position.

5. The method of claim 1 wherein the engine operating condition includes a pressure signal magnitude.

6. The method of claim 1 wherein the engine operating condition includes engine load, angular engine position, and a pressure signal magnitude.

7. The method of claim 1 wherein the filter includes a finite impulse response filter.

8. The method claim 1 wherein the filter includes an infinite impulse response filter.

9. The method of claim 1 further comprising generating in-cylinder pressure signals for other cylinders of the engine.

10. A control system comprising:
    a filter coefficient determination module that generates filter coefficients based upon an engine operating condition;
    a filter module that filters an in-cylinder pressure signal with a filter having the filter coefficients to form a filtered pressure signal;
    an engine control module that controls the engine using the filtered pressure signal;
    a comparison module that compares the filtered pressure signal to a threshold; and
    a fault indication module that generates a diagnostic signal for an engine component in response to the comparison.

11. The control system of claim 10 wherein the filter coefficients are based upon angular engine position.

12. The control system of claim 10 wherein the filter coefficients are based upon crankshaft angular engine position.

13. The control system of claim 10 wherein the filter coefficients are based upon a pressure signal magnitude.

14. The control system of claim 10 wherein the filter coefficients are based upon engine torque.

15. The control system of claim 10 wherein the filter coefficients are based upon more than one of angular engine position, pressure signal magnitude and engine torque.

16. The control system of claim 10 wherein the filter comprises a finite impulse response filter.

17. The control system of claim 10 wherein the filter comprises an infinite impulse response filter.

18. A system comprising:
    an in-cylinder pressure sensor; and
    the control system of claim 10 in communication with the in-cylinder pressure sensor.

* * * * *